United States Patent
Palmer (10) Patent No.: US 10,824,894 B2
(45) Date of Patent: Nov. 3, 2020

(54) DOCUMENT CONTENT IDENTIFICATION UTILIZING THE FONT

(71) Applicant: BANK OF AMERICA CORPORATION, Charlotte, NC (US)

(72) Inventor: Tomas Earl Palmer, Shavano Park, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 119 days.

(21) Appl. No.: 16/208,365

(22) Filed: Dec. 3, 2018

(65) Prior Publication Data

US 2020/0175295 A1 Jun. 4, 2020

(51) Int. Cl.
*G06K 9/18* (2006.01)
*G06F 16/93* (2019.01)

(52) U.S. Cl.
CPC .............. *G06K 9/18* (2013.01); *G06F 16/93* (2019.01)

(58) Field of Classification Search
CPC .. G06K 9/18; G06K 9/00; G06K 9/20; G06K 9/22; G06K 9/36; G06K 2209/01; G06F 16/93; G06F 3/048; G06F 11/3438; G06F 16/9577; H04L 67/025; H04L 67/22; H04L 12/24; G06Q 10/0639; G06Q 10/06393; G06Q 30/00; G06Q 10/06398; G06Q 30/02
USPC .............................................. 382/182; 726/25
See application file for complete search history.

(56) References Cited

U.S. PATENT DOCUMENTS

| | | |
|---|---|---|
| 6,918,039 B1 | 7/2005 | Hind et al. |
| 6,937,730 B1 | 8/2005 | Buxton |
| 7,222,078 B2 * | 5/2007 | Abelow ............. G06Q 10/0639 705/1.1 |
| 7,885,944 B1 * | 2/2011 | Bruening ................. G06F 16/33 707/694 |
| 8,200,527 B1 * | 6/2012 | Thompson ......... G06Q 10/0639 705/7.39 |
| 8,347,398 B1 | 1/2013 | Weber |
| 8,649,552 B2 | 2/2014 | Balakrishnan et al. |
| 9,143,638 B2 * | 9/2015 | King ....................... G06F 16/58 |
| 9,189,514 B1 * | 11/2015 | Myslinski ............ G06F 40/226 |
| 9,354,778 B2 * | 5/2016 | Cornaby ............... G06F 1/1686 |
| 9,477,836 B1 | 10/2016 | Ramam et al. |
| 9,608,982 B2 | 3/2017 | Ufford et al. |
| 9,760,548 B2 | 9/2017 | Cooke et al. |

(Continued)

*Primary Examiner* — Mahendra R Patel
(74) *Attorney, Agent, or Firm* — Michael A. Springs; Moore & Van Allen PLLC; Jeffrey R. Gray (57) ABSTRACT

Information determination and decisioning systems that allow for the classification, identification, and decisioning of personally identifiable information (hereinafter "PII") that is located within documents. Text within a document may be identified as PII text and/or non-PII text, and PII indicators may be associated with the font of the text in order to define and be able to track the PII text within the document. The PII indicators may provide different information about the PII text, such as indicating that the text includes PII, the PII type associated with the text, the locations in which the text constitutes PII. The PII indicators may be stored within the font information of the font, such as through data stored by the font and/or the data used to create the font (e.g., vector images that define the font curves, the dot matrices that define the font, the stroke paths that define the font, etc.).

20 Claims, 3 Drawing Sheets

(56) References Cited

U.S. PATENT DOCUMENTS

| | | | |
|---|---|---|---|
| 9,769,354 B2* | 9/2017 | Thrasher | G06K 9/036 |
| 10,146,795 B2* | 12/2018 | Macciola | H04N 1/387 |
| 10,769,431 B2* | 9/2020 | King | H04N 1/107 |
| 2002/0032875 A1* | 3/2002 | Kashani | G06F 1/1632 |
| | | | 713/300 |
| 2002/0077999 A1 | 6/2002 | Fergus | |
| 2002/0091741 A1 | 7/2002 | Ferreira et al. | |
| 2004/0006742 A1* | 1/2004 | Slocombe | G06F 40/205 |
| | | | 715/234 |
| 2005/0044409 A1 | 2/2005 | Betz et al. | |
| 2005/0154690 A1* | 7/2005 | Nitta | G06F 16/30 |
| | | | 706/46 |
| 2005/0289358 A1 | 12/2005 | Haselden et al. | |
| 2006/0015813 A1* | 1/2006 | Chung | G06F 40/117 |
| | | | 715/201 |
| 2009/0172035 A1* | 7/2009 | Lessing | G06Q 30/02 |
| 2011/0179352 A1* | 7/2011 | Treadwell | G06F 40/166 |
| | | | 715/255 |
| 2013/0124532 A1* | 5/2013 | McQuarrie | G06F 40/106 |
| | | | 707/748 |
| 2013/0132833 A1* | 5/2013 | White | G06F 11/3438 |
| | | | 715/704 |
| 2016/0004868 A1* | 1/2016 | Robke | G06F 21/6218 |
| | | | 726/25 |
| 2017/0004331 A1 | 1/2017 | Weldon et al. | |
| 2017/0237723 A1 | 8/2017 | Gupta et al. | |
| 2017/0249507 A1* | 8/2017 | King | G06K 7/1404 |
| 2017/0286765 A1* | 10/2017 | Rodriguez | G06K 9/00469 |
| 2018/0075254 A1 | 3/2018 | Reid et al. | |
| 2019/0377900 A1 | 12/2019 | Balzer et al. | |
| 2020/0013091 A1* | 1/2020 | Byron | G06Q 30/0271 |

* cited by examiner

DOCUMENT CONTENT IDENTIFICATION UTILIZING THE FONT

FIELD

The present invention relates to an information identification and decisioning system, and more particularly, to an information identification and decisioning system that is used to improve processing with respect to the information.

BACKGROUND

Identifying information within documents and determining decisioning with respect to such documents based on the information within the documents may be a difficult and inefficient process. Traditional methods and systems of making these determinations are not accurate, require multiple models for different entities, and/or require large processing and memory requirements. As such, it is difficult to effectively identify information within documents and make decisions regarding such documents. Traditional methods overburden the systems that an organization uses, and as such, improvements to the traditional systems are needed.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for information determination and decisioning systems that allow for the classification, identification, and decisioning of personally identifiable information (hereinafter "PII") that is located within one or more documents that are stored, sent, and/or received through the one or more systems. As such, it should be understood that text within a document may be identified as PII text and/or non-PII text, and one or more PII indicators may be associated with the font of the text in order to define and be able to track the PII text within the document. It should be understood that the one or more PII indicators may provide different information about the PII text, such as indicating that the text includes PII, the PII type associated with the text, the locations (e.g., regions, countries, states, provinces, or the like) in which the text constitutes PII, when the PII should be displayed or prevented from being displayed, the importance of the PII, or the like. It should be understood that the one or more PII indicators may be stored within the font information of the font, such as through data stored by the font itself (e.g., metadata stored, or other data), the data used to create the font (e.g., vector images that define the font curves, the dot matrices that define the font, the stroke paths that define the font, or other like font techniques), or the like, which will be described in further detail herein. In some embodiment, the font information on includes formulas that are used to define the curves of the font, and such formulas may be used not only to render the font in accordance with the formulas, but also to indicate information about the document, such as the PII text located in the document, as will be discussed herein. In addition to storing one or more PII indicators within the font of the documents, one or more rules engines may be utilized in order to determine the text in a document and respond by automatically using a font for the text to define the PII within the text in the document, to identify one or more users associated with an action for the documents (e.g., accessing, viewing, sending, receiving, printing, transferring, or the like) and determining the rights that the one or more users have with respect to the action, to decision what PII text may be displayed within the document, and/or to make other determinations with respect to the PII text, as will be described in further detail herein. It should be further understood that when storing the documents that include PII text or other information, the different PII text or other information within the document, or potions thereof, may be split up into sub-documents and stored separately. The document, including the type and location of the PII text, may be mapped in order to allow the splitting and reconstructing of the document. When an action is taken on the document, such as sending the document to a user for viewing, the document may be reconstructed based on the access rights of the user that is receiving the document. That is, all, some, or none of the PII text within the document may be available to the user based on what rights the user has. For example, the PII information may be redacted (e.g., blocked out, replaced with random characters, made invisible, or the like), when the user does not have the right to view some or all of the PII text. The redaction and/or storage of the PII in separate sub-documents improves the security and storage of the PII. Moreover, should the PII text be redundant across various documents, the PII text need only be stored once for all of the documents. As such, whenever a particular document that includes the specific PII texts is being reconstructed, it can pull the PII text that is stored. As such, memory requirements are less because redundant PII text does not need to be stored in and/or for each and every document that includes the PII text.

It should be understood, as discussed generally herein, that the present invention includes a technical improvement because utilizing the font to define the PII within documents does not increase, or significantly increase the memory requirements, processing speeds, and/or processing efficiency of the systems discussed herein. It should be understood that the systems and documents already store the font information (e.g., vector images of the curves, pixel matrices, stroke paths, or the like) in order to be able to display (e.g., define, render, reproduce, print, or the like) the font within the documents. As such, by using the font not only to allow for the display of the text, but also to define PII in the document, it does not increase, or significantly increase, the requirements of the systems because the font information is already needed to display the font. Moreover, as discussed above mapping the PII text in a document, splitting and storing the document into sub-documents, also reduces storage requirements because the same PII text across multiple document only has to be stored once. As such, the present invention may lessen the requirements of defining and monitoring PII within documents because the present disclosure indicates that such information may be embedded within the font information that already exists, instead of having to create specialized documents and/or attaching additional information within the documents to identify the PII, and moreover, the PII text for multiple documents only has to be stored once.

Embodiments of the invention comprise systems, computer implemented methods, and/or computer program products for a document content identification system. The document content identification system comprises monitoring use of one or more documents from a plurality of documents, capturing font information of font within the one or more documents, and identifying one or more personally identifiable information (PII) indicators from the font information captured from the font of the one or more documents. The invention further comprises implementing a decisioning action for the use of the one or more documents based on the one or more PII indicators from the font information captured.

In further accord with embodiments, the invention comprises forming the one or more documents, wherein the one or more documents are populated with the one or more PII indicators within the font information of the font.

In other embodiment of the invention, the one or more PII indicators are automatically implemented as a user enters text into the one or more documents.

In still other embodiments of the invention, the one or more PII indicators are selected by a user after text is entered into the one or more documents.

In yet other embodiments of the invention, the one or more PII indicators are automatically implemented based on a location within the one or more documents in which text is entered.

In further accord with embodiments of the invention, monitoring the use of the one or more documents comprises identifying a user request to access, view, distribute, save, transfer, update, send, receive, copy, open, upload, download, edit, print or take another document action with respect to the one or more documents.

In other embodiments of the invention, the decisioning action comprises preventing the user request, or redacting at least a portion of the text that is PII text within the one or more documents before allowing the user request.

In still other embodiments, the invention further comprises accessing one or more PII rules engine, determining one or more PII rules based on the one or more PII indicators within the one or more documents, and wherein implementing the decisioning action for the use of the one or more documents is based at least in part on the one or more PII rules.

In yet other embodiments of the invention, the one or more PII indicators identify a PII type from a plurality of PII types.

In further accord with embodiments of the invention, the font information comprises one or more vector images that define the font for the one or more documents, and wherein the one or more PII indicators are defined by the one or more vector images used to define the font.

In other embodiments of the invention, the font information comprises one or more matrices of pixels representing one or more glyphs for the font, and wherein the one or more PII indicators are defined by the one or more matrices of pixels used to define the font.

In still other embodiments of the invention, the font information comprises one or more stroke paths that define the font for the one or more documents, and wherein the one or more PII indicators are defined by the one or more stroke paths used to define the font.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Generally, systems, computer implemented methods, and computer products are described herein for information determination and decisioning systems that allow for the classification, identification, and decisioning of personally identifiable information (hereinafter "PII") that is located within one or more documents that are stored, sent, and/or received through the one or more systems. As such, it should be understood that text within a document may be identified as PII text and/or non-PII text, and one or more PII indicators may be associated with the font of the text in order to define and be able to track the PII text within the document. It should be understood that the one or more PII indicators may provide different information about the PII text, such as indicating that the text includes PII, the PII type associated with the text, the locations (e.g., regions, countries, states, provinces, or the like) in which the text constitutes PII, when the PII should be displayed or prevented from being displayed, the importance of the PII, or the like. It should be understood that the one or more PII indicators may be stored within the font information of the font, such as through data stored by the font itself (e.g., metadata stored, or other data), the data used to create the font (e.g., vector images that define the font curves, the dot matrices that define the font, the stroke paths that define the font, or other like font techniques), or the like, which will be described in further detail herein. In some embodiment, the font information on includes formulas that are used to define the curves of the font, and such formulas may be used not only to render the font in accordance with the formulas, but also to indicate information about the document, such as the PII text located in the document, as will be discussed herein. In addition to storing one or more PII indicators within the font of the documents, one or more rules engines may be utilized in order to determine the text in a document and respond by automatically using a font for the text to define the PII within the text in the document, to identify one or more users associated with an action for the documents (e.g., accessing, viewing, sending, receiving, printing, transferring, or the like) and determining the rights that the one or more users have with respect to the action, to decision what PII text may be displayed within the document, and/or to make other determinations with respect to the PII text, as will be described in further detail herein. It should be further understood that when storing the documents that include PII text or other information, the different PII text or other information within the document, or potions thereof, may be split up into sub-documents and stored separately. The document, including the type and location of the PII text, may be mapped in order to allow the splitting and reconstructing of the document. When an action is taken on the document, such as sending the document to a user for viewing, the document may be reconstructed based on the access rights of the user that is receiving the document. That is, all, some, or none of the PII text within the document may be available to the user based on what rights the user has. For example, the PII information may be redacted (e.g., blocked out, replaced with random characters, made invisible, or the like), when the user does not have the right to view some or all of the PII text. The redaction and/or storage of the PII in separate sub-documents improves the security and storage of the PII. Moreover, should the PII text be redundant across various documents, the PII text need only be stored once for all of the documents. As such, whenever a particular document that includes the specific PII texts is being reconstructed, it can pull the PII text that is stored. As such, memory requirements are less because redundant PII text does not need to be stored in and/or for each and every document that includes the PII text.

Figure 1:
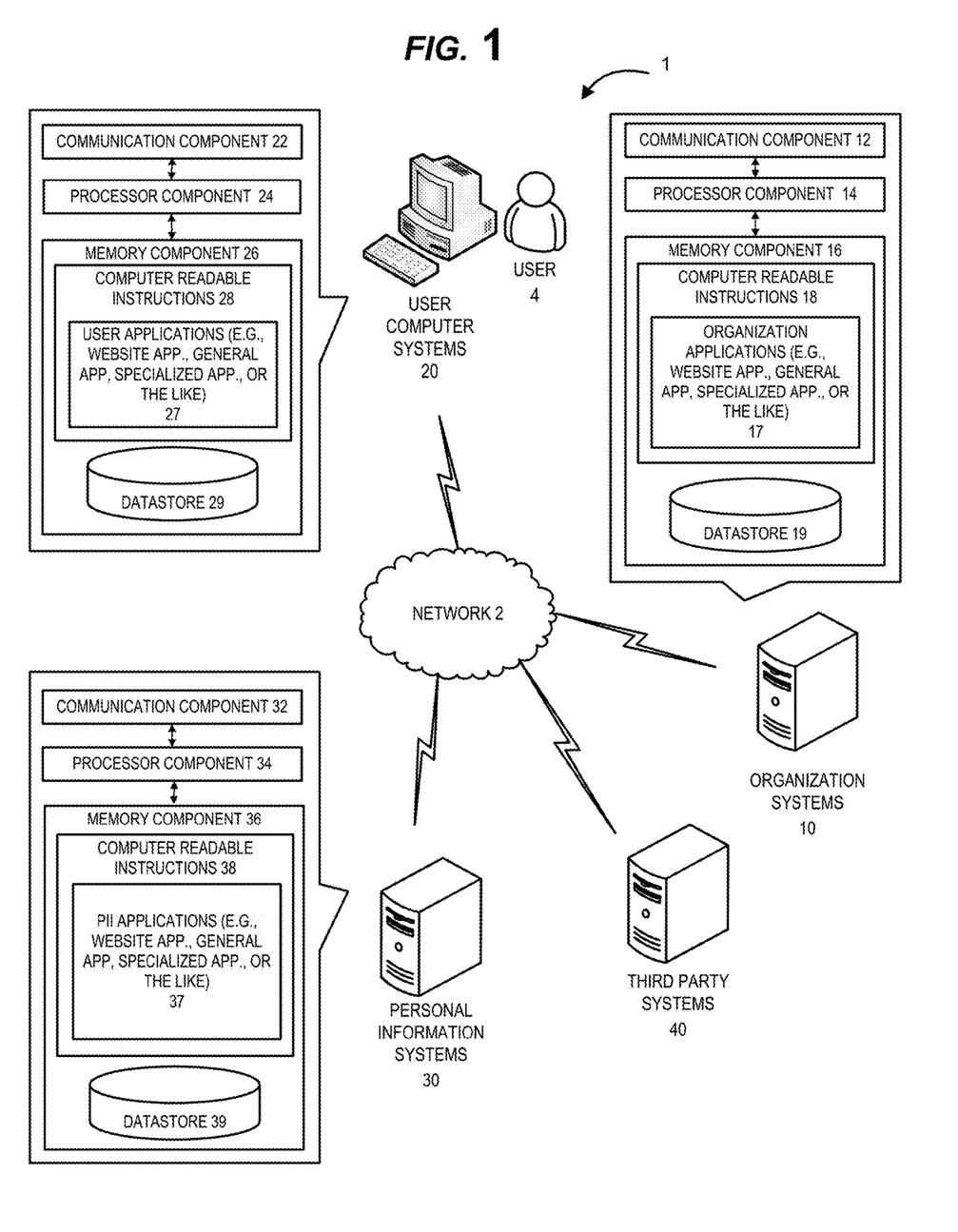
FIG. 1 illustrates a block diagram of a PII identification and decisioning system, in accordance with one or more embodiments of the invention.

FIG. 1 illustrates an information determination and decisioning system environment 1, in accordance with embodiments of the invention. As illustrated in FIG. 1, one or more organization systems 10 are operatively coupled, via a network 2, to one or more user computer systems 20, one or more personal information systems 30, one or more third party systems 40, and/or one or more other systems (not illustrated). It should be understood that the information determination and decisioning system environment 1 allows for the creation, identification, and distribution of one or more documents with PII.

It should be understood that the one or more organization systems 10 may be the systems that that the organization uses to operate the organization. The users 4 (e.g., one or more associates, employees, agents, contractors, sub-contractors, third-party representatives, customers, or the like), may include customers or employees of the organization, or the like. The users 4 may use the user computer systems 20 to communicate with the other systems and devices (e.g., organization systems 10, other user computer systems 20, third-party systems 40, and/or other systems) and/or components thereof. The one or more personal information systems 30 may be used by the organization and/or the users 4 associated with the organization to create, monitor and/or control the personally identifiable information within documents that are being sent within or outside of the organization. The third-party systems 40 may include the systems of parties outside of the organization to which documents containing the PII may be sent or from which the documents containing the PII may be received. The other system (not illustrated), may include the systems that are used to send, receive, print, or take other actions with respect to the documents that include the PII.

It should be understood that rules and regulations regarding the capture and disclosure of PII are becoming more prevalent, and such rules and regulations are different in different countries. As such, for organizations that operate in across the globe or receive PII from users or organization across the globe, PII may be viewed, used, downloaded, received, sent, transferred, printed, or the like by different users in different ways across the organization, one or more users 4, and/or one or more third parties within our across various locations. Consequently, the information determination and decisioning system environment 1 described herein may be utilized in order to control how documents within the system that contain PII are viewed, used, downloaded, received, sent, transferred, printed, or the like by different users in different ways in a way that the organization can efficiently manage and in compliance the various rules and regulations across different locations.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more personal information systems 30, the one or more third party systems 40, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., Web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more personal information systems 30 and personal information applications 37, the one or more third party systems 40 and applications thereof (not illustrated), and/or other systems and applications thereof (not illustrated). It should be understood that the one or more organization applications 17 may comprise the applications that are used by the organization to run operations of the business, including the applications used to create, store, and/or transfer documents within and/or outside of the organizations.

As further illustrated in FIG. 1, the one or more user computer systems 20 are operatively coupled, via a network 2, to the one or more organization systems 10, the one or more personal information systems 30, the one or more third party systems 40, and/or the one or more other systems. As illustrated in FIG. 1, users 4 may use the one or more user computer systems 20 to communicate with the one or more organization systems 10 and/or one or more personal information systems 30 to create, view, download, and/or transfer one or more documents that may or may not include PII. The actions taken by the user 4 may occur internally within the organization and/or outside of the organization, as will be described in further detail herein.

It should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more personal information systems 30, the one or more third party systems 40, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., create, view, download, transfer, or the like the documents with PII).

As illustrated in FIG. 1, the one or more personal information systems 30 are operatively coupled, via a network 2, to the one or more organization systems 10, the one or more user computer systems 20, the one or more third party systems 40, and/or other systems. The one or more personal information systems 30, as will be described in further detail herein, may be utilized in order to allow for the creation of the documents that embed the one or more PII indicators within the documents (e.g., through the font information, or the like), identifies the one or more PII indicators within the documents that indicates the presence of PII text, takes actions when PII text is identified within the documents, or the like. The one or more personal information systems 30 may be utilized for more efficient monitoring and control of documents that include PII text, as will be discussed in further detail herein.

The personal information systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more third party systems 40, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more personal information systems 30 may have computer-readable instructions 38 stored in the one or more memory components 36, which in some embodiments includes the computer-readable instructions 38 of one or more personal information applications 37 that are used to embed information in documents that include PII text, monitor the use of the documents that include PII text, and/or take actions on the documents, or the PII text within the documents, to more efficiently control access and use of documents with the PII text.

Moreover, the one or more third party systems 40 and/or the one or more other systems may be operatively coupled to and communicate with the one or more organization systems 10, the one or more user computer systems 20, and/or the one or more personal information systems 30, through the network 2. The one or more third party systems 40 and/or the one or more other systems may have the same or similar components as the one or more organization systems 10, the one or more user computer systems 20, and/or the one or more personal information systems 30

(e.g., communication component, processor component, memory component—computer readable instructions for applications, datastore). As such, the one or more third party systems 40 and/or the one or more other systems may communicate with the one or more organization systems 10, the one or more user computer systems 20, the one or more personal information systems 30, and/or each other in the same or similar way as previously described with respect to the one or more organization systems 10, the one or more user computer systems 20, and/or the one or more personal information systems 30.

It should be understood that the one or more third party systems 40 may comprise any type of device or component thereof, such as a desktop, mobile device (e.g., laptop, smartphone device, PDA, tablet, watch, wearable device, or other mobile device), server, wireless device, or any other type of system hardware, or combination thereof, through which one or more documents may be created, stored, viewed, downloaded, received, sent, transferred, or the like. As such, it should be understood that the one or more third party systems 40 may send or receive documents that contain PII text, as such, the documents sent to or receive from, and/or the PII text therein, may be controlled and/or monitored in order to control the access and use of PII. In this way, the organization may be able to control the use and distribution of PII, which in some instances may conflict with the rules and/or regulations of the organization, third-parties, and/or countries from which the documents are received and/or to which the documents may be sent. It should be further understood that the one or more other systems (not illustrated) may be a part of the one or more organization systems 10, the one or more user computer systems 20, the one or more personal information systems 30, and/or the one or more third party systems 40, and in some embodiments may comprise the systems that are used to transfer, receive, send, download, print (e.g., printers, or like), or the like, the documents that may include PII text.

Figure 2:
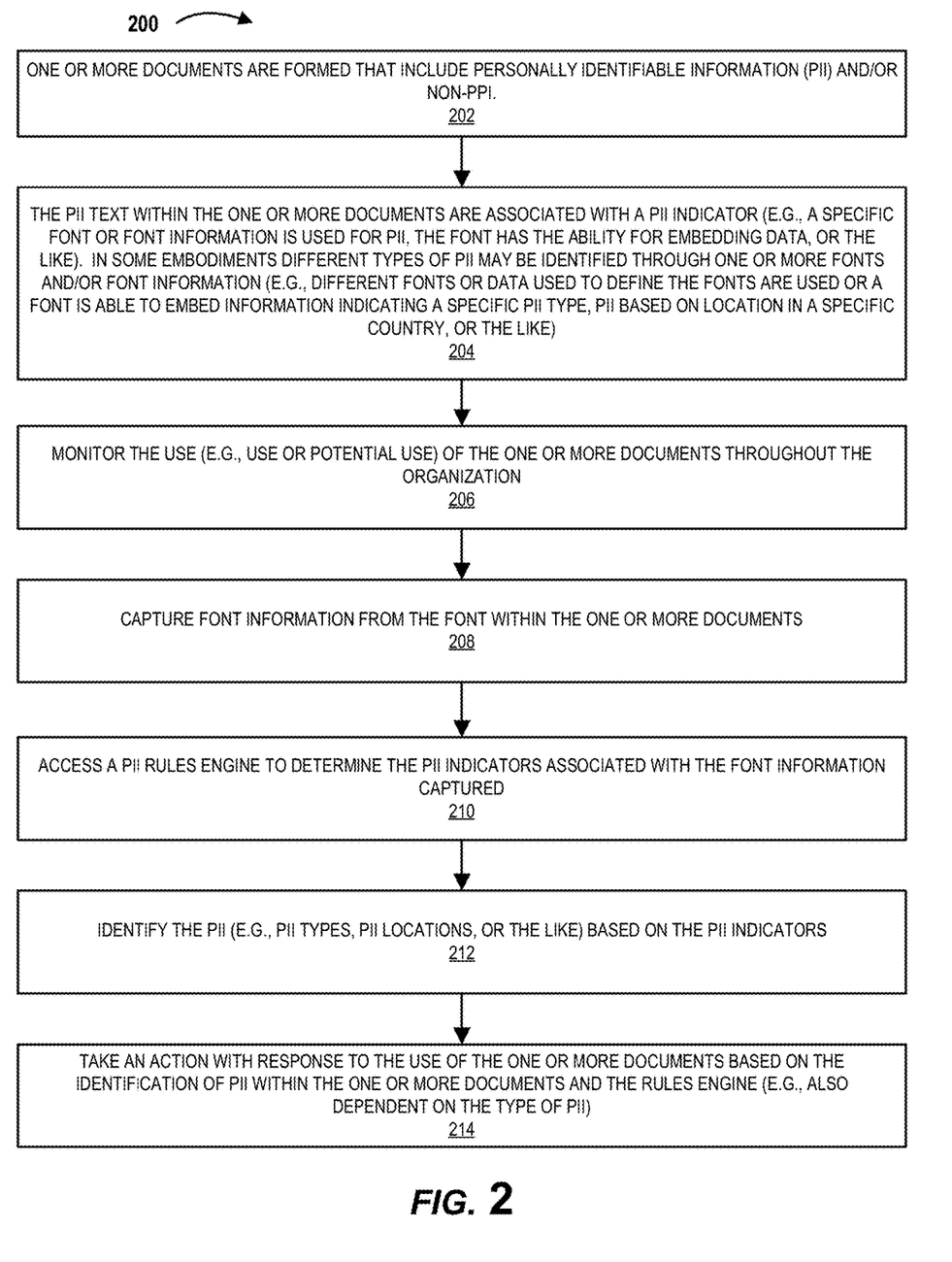
FIG. 2 illustrates a font information identification process flow, in accordance with one or more embodiments of the invention.

FIG. 2 illustrates a font information identification process flow, in accordance with one or more embodiments of the invention. As illustrated in block 202 of FIG. 2, one or more documents are formed that include PII and/or non-PII. It should be understood that the one or more documents may be created in a number of different ways. For example, a user 4 may create a document and/or a system may automatically create a document that has PII and/or non-PII. For example, a user 4 may create one or more documents in which PII text is entered. It should be understood that text may include any letters, numbers, symbols, and/or any other type of characters that may be included in a document. As previously discussed, PII may include a user name, company, title, phone number, email address, fax, postal address, city, state or province, zip code, credit information (e.g., such as accounts payable contact information, account numbers, bank references, D&B numbers, tax identification numbers, financial statement numbers, or other credit information), IP address, username, device name, or other identifying information, or combinations thereof, which may be may be used to identify a user 4, or otherwise relate to confidential information of a user. While a document is being formed, any PII text that may be included in the document may be associated with one or more PII indicators. The one or more PII indicators may indicate that the particular PII text (or portion of the document that includes the text) is PII, a PII type, and/or specifics related to the PII. For example, the one or more PII indicators may indicate that the PII text is a name, social security number (SSI), account number, phone number, address, or any other type of PII. It should be understood that information identified as PII by one country may not be PII in a different country. As such, the one or more PII indicators may include information related to the PII type, PII location that indicates in what locations the text is considered PII, or the like.

It should be further understood that the one or more PII indicators may be defined by the text in a number of different ways. For example, in one embodiment of the invention the one or more PPI indicators may be identified by the font used for the PII text (e.g., based on the font type, font curves, embedded into the font data, or the like) in the one or more documents. In some embodiments, the font itself may comprise information, such as font information with which metadata may be associated (e.g., embedded within, defined by, adjusted based on, or the like). The metadata may include the one or more PII indicators described herein. In other examples, the font information may define the one or more PII indicators through the use of a plurality of vector images, a matrix of a plurality of pixels, a plurality of stroke paths, or other like techniques. This font information is used to define and render the fonts for the one or more documents (e.g., how the fonts are displayed, transmitted, stored, printed, or the like). As such, this font information may also be used to define the one or more PII indicators. For example, the one or more PII indicators may identify if the font, and thus the text associated with the font, relates to PII text or non-PII text, the PII type, the locations where the PII does or does not constitute PII, or the like. It should be understood that the particular vector images, the matrix of pixels, the plurality of stroke paths, or the like, or portions thereof, and in particular the formulas used to define the forgoing, may determine the one or more PII indicators.

With respect to the plurality of vector images, the vector images may be slightly different based on if the text is related to PII text or non-PII text. Vector images may comprises lines and curves (e.g., Bezier curves, quadratic Bezier curves, or the like, or combinations thereof) that define glyphs that represent the font. The vector images can be scaled without pixilation issues, which may result in more attractive fonts at various sizes, however, the vector images may require more processing and sometimes result in rendering issues. As such, one vector images for at least a portion of one or more characters within the text may indicate the text PII text, while a different vector image, that is very similar, may indicate that the text is non-PII text.

With respect to a matrix of pixels representing the image of one or more glyphs for the font, the matrix of pixels may be different based on if the text is related to PII or non-PII. Utilizing the matrix of pixels provide fast rendering, it is easily created, and/or consistently displayed on various displays. It should be understood that, as previously discussed with respect to different vector images, different matrices of pixels may indicate that the PII text is related to different PII types. For example, the matrices of pixels may be changed for PII text verses non-PII text. The differences may or may not be visible to the human eye; however, the differences in the matrices of pixels may be identified when scanning the document.

Finally, with respect to stroke paths, different stroke paths may indicate that the text is PII and/or non-PII text. For example, glyphs may be defined by vertices of individual stroke paths and stroke profiles. Stroke paths provide the outline for the font that allow for different profiles that change the weight, width, or the like. Using stroke paths may make it easier to edit glyphs and may make such edits less error prone. Different stroke paths and/or stroke profiles may be utilized to define PII text versus non-PII text.

In some embodiments of the invention, regardless of how the font is displayed (e.g., using vector images, matrix of pixels, stroke paths, or the like), the PII indicators may be defined by the font information through the use of formulas (e.g., math that defines the curves, dot matrix of pixels, stroke paths, or the like) used to construct the font. For example, original font information may define original fonts using one or more curves and/or lines (e.g., the mathematical formula used to define the curves identified in different characters, such as but not limited to "a", "B", "@", "6", or any other character), which may indicate the occurrence of non-PII text, a lack of PII text, or the like. Alternatively, another formula (e.g., slightly different formula, completely different formula, or the like) may be utilized to define an alternate font that may look the same, similar, or different than the original font. Regardless of whether or not the font of the text looks the same or different, the different formulas may be used in order to define the text as PII text, non-PII text, PII type, PII location information, or the like. It should be further understood that any way to define the font using a curve may be possible, but some types of curve to font determinations may be more vulnerable to discovery (e.g., through misappropriation, or the like). Alternatively, using various formulas to define the curves that define the font that indicates the text as being PII, non-PII, PII type, PII location information, or the like, makes the security of the PII text within the document more secure. As such, utilizing formulas to define the font for PII text and/or associated PII information, makes the definition of the PII text and/or PII information in document more secure and less susceptible to misappropriation by misappropriators (e.g., harder for a misappropriator to access and/or identify the different formulas used to define the font).

In some embodiments of the invention, indicators (e.g., PII indicators) stored by the font (e.g., as stored within the font, in individual characters of the font, in portions of characters, or the like using font information) may or may not relate to the content of the text in which the indicators are stored, the content of the documents itself, and/or the like. For example, the font information indicating the presence of PII text may occur within the text that represents the PII text, or it may occur within text in other locations of the document that may or may not include PII text. As such, for security purposes the font information indicating that PII text is located in the document may be stored within the non-PII text (e.g., makes it harder for misappropriation of the PII text). In still other embodiments of the invention, the document may store font information (e.g., regarding PII text) in the document, which may be is unrelated to the any of the text within the document itself.

It should be understood that one or more different fonts and/or font information may be used in different ways to associate the one or more PII indicators with particular PII text within one or more documents. Block 204 of FIG. 2 illustrates that PII text within the one or more documents may be automatically and/or manually associated with one or more PII indicators, which allows the text to be identified as PII text or non-PII text, the PII type, PII based on location, or other like PII information. In some embodiments the one or more PII indicators for different types of PII are stored for future use with text within one or more documents based on the type of text included in the one or more documents. Moreover, rules may be stored within one or more rules engines (e.g., a PII rules engine, or the like) regarding when the one or more PII indicators may be assigned to text (e.g., identifying it as PII text, or the like) and what font and/or font information should be used for the text. For example, rules may be stored such that when an "@" symbol is used in connection with a ".com" and/or other information, the text within the one or more documents relate to this type of text may be automatically defined as PII text and assigned one or more PII indicators. The one or more PII indicators may include information that indicates that the text is PII text, the text is an e-mail address, it is PII in all jurisdictions, and/or other like information regarding the PII. Moreover, in another example, rules may be stored that when a string of numbers appear near text in a document that references "account", a "SSN", "tax number", or other like text, the string of numbers may automatically be identified as PII text and assigned one or more PII indicators. The one or more PII indicators may include information that indicates that the text is PII text, the text is an account number, SSN, or tax number, and/or it is PII in one or more jurisdictions. It should be further understood that the format of the text may also be used to define the PII type. For example, nine digit numbers (with or without hyphens) may be automatically defined as SSNs, ten digit numbers (with or without hyphens) may be identified as phone numbers, sixteen digit numbers (with or without hyphens and/or spaces between every four digits) may be identified as account numbers (e.g., credit card, savings, debit card, or the like). Additionally, first, last, and middle names, and/or combinations thereof, may be stored in one or more rules engines such that when one or more names appear in a document, the names are identified as PII automatically. It should be understood that rules may be standardized and/or customized and stored for any type of PII that an organization may potentially have within its documents.

Alternatively, and/or in addition to automatically determining that text is PII, the one or more users 4 may identify that the text within a document is PII (e.g., selecting the text, when typing the text, clicking on the text, or the like). For example, a user may make a selection of specific text within a document and utilize a feature (e.g., select a button in a toolbar, highlight in a specific color, change the font, or the like) that indicates that the text is PII, a specific PII type, and/or the location in which the text is PII (or the location where the text is PII may be automatically determined by a rules engine). In some embodiments it should be understood that the feature may allow the user to define the text as different PII types and/or provide additional PII information. Moreover, the one or more users 4 may change text as being non-PII, or a different PII types, after the system has automatically, or a user has manually, identified the text as PII.

In some embodiments of the invention, the text in the one or more documents may or may not illustrate that the text has been identified as PII. For example, as the text is determined to be PII, automatically by the system and/or by one or more users, the text may be highlighted, underlined, italicized, bolded, color changed, and/or different font may be used (same font type with changes to particular letters, words, sentences, paragraphs, or portions thereof). For example, as text is being typed, and/or after the text is typed, and the text is determined to be PII text (e.g., automatically or manually by the user), the text may be changed to illustrate to the user 4 that the text is PII. Alternatively, or additionally, the font (e.g., font type, font information, or the like) within the text itself may be changed. For example, a different type of font information may be used. It should be understood that the font change may or may not be visible to the user 4. For example, a different image vector, matrix of pixels, stroke within the font, or the like may be used to indicate that the font used for the text indicates that the text is PII text and/or other information about the PII (e.g., type, location in which the text is PII, or the like). The differences in the image vector, matrix of pixels, stroke length, or the like, or the formulas that define the font, may be subtle changes that can only be recognizable by a system (or application thereof) that analyzes the font (e.g., scanning, rending, displaying, or the like) and/or formulas that define such font. Alternatively, in some embodiments of the invention, the changes to the font may be recognizable to the human eye, such that a user may identify that the text is PII text. It should also be understood that not only may differences in the font information itself (e.g., differences for the same type of font—i.e., two different types of "Times New Roman", "Arial", or other font type) be used to define the one or more PII indicators, but entire font types may be designated for one or more PII indicators.

As such, it should be understood that regardless of how the text is changed within the one or more documents to indicate that the text is PII (e.g., changes in the font used, which may or may not be identifiable to the human eye), the one or more PII indicators within the text may be identified by the system (or application thereof) in order to determine one the or more documents that include PII and/or identify what PII is located within the one or more documents.

In some embodiments of the invention the font information must be tied to the document in order for non-cooperating systems (e.g., different systems, different applications, and/or the like) to be able to identify and render font information from the document. For example, the information (e.g., the formulas, or the like) may be embedded into the document itself in order to allow non-cooperating systems to identify and/or render the text in the correct font using the font information. Alternatively, the non-cooperating systems may have the capability to identify the font information from the font (e.g., identify the formula from the curves of the font) without having to embed the font information in the document.

Block 206 in FIG. 2 illustrates that use of the one or more documents within the organization is monitored. For example, the one or more personal information systems 30 and/or the one or more organization systems 10 may be utilized to monitor when one or more users 4 are taking document actions (e.g., trying to take an action, an action is taken, and/or the like) with respect to the one or more documents. The document actions may be viewing, updating, copying, receiving, sending, transferring, uploading, downloading, printing, or the like, or trying to do any of the forgoing. That is, whenever the document action is taken in association with a document, the one or more personal information systems 30 and/or the one or more organization systems 10 may be utilized in order to analyze (e.g., scan, identify, or the like) the document for PII before the document action is allowed.

Thereafter, as illustrated by block 208 of FIG. 2, the one or more personal information systems and/or the organization systems 10 may capture the font information from the font within the one or more documents. The font information may be captured by capturing all of the font information from the text within the document associated with the action. It should be understood that the font information is typically captured whenever the document is accessed, transferred, rendered for display, sent for printing, or the like. As such, in some embodiments capturing the font information may include the same process that is usually done for viewing, printing, or the like the document. In some embodiments, the system may capture all of the font information from all of the text within the document for comparison with the PII rules within the one or more PII rules engine. Alternatively, the font information may only be captured when a second, third, fourth, or other like font is identified that is different than a first font. For example, the first font may be the majority of the font within the document, or may be any one of the plurality of standard fonts within the document. Alternatively, the second, third, fourth, or $n^{th}$ fonts may be identified, and thus, font information captured therefor, when these fonts are different than the standard fonts used in the document. For example, the one or more standard fonts may include the original fonts for the document (e.g., a standard font type with standard font information, or the like), while one or more PII fonts (e.g., alternate standard font type—i.e., same font defined by different image vector, pixels, stroke paths, or the like—or specific fonts used for PII, or the like) may be used for PII text within the document.

Figure 3:
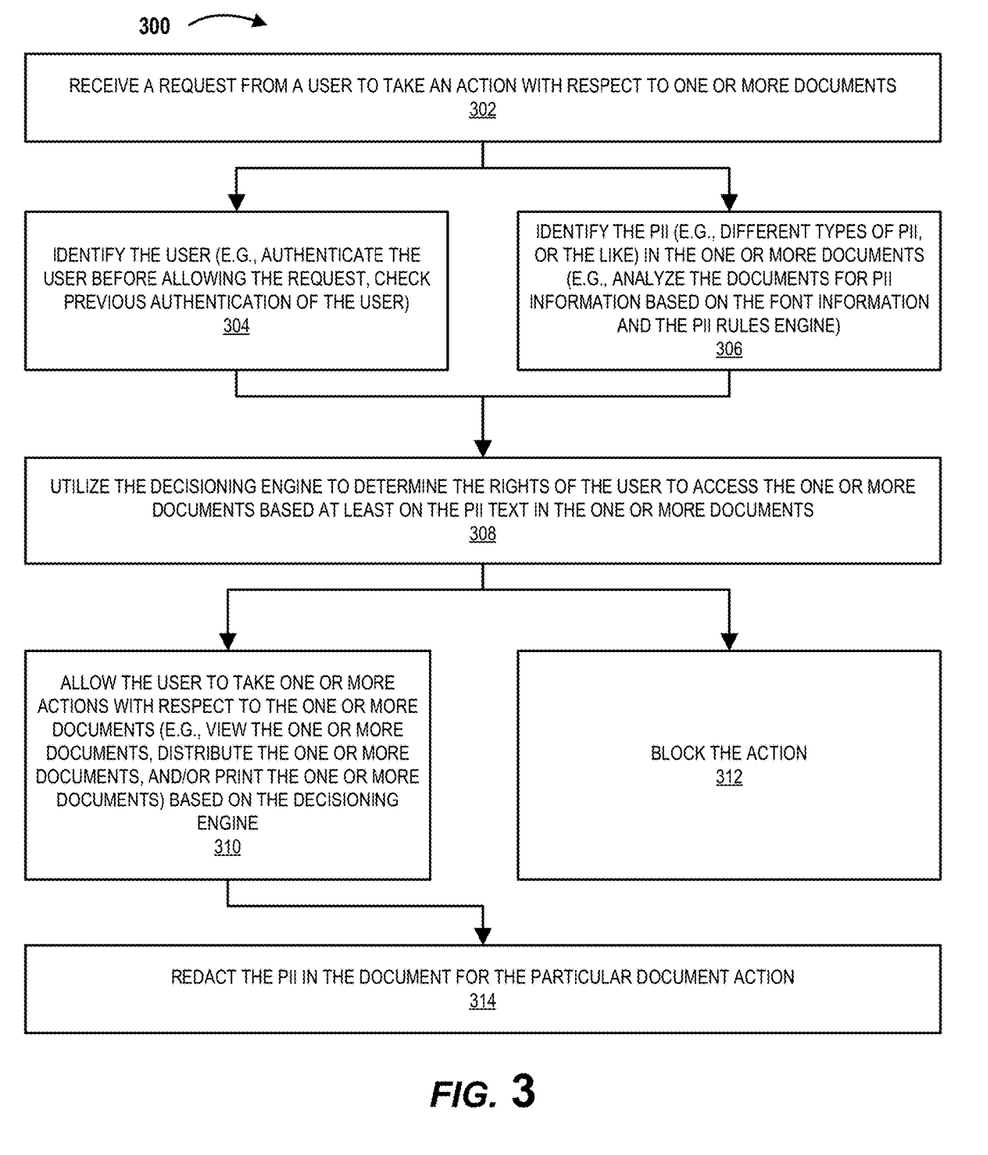
FIG. 3 illustrates a document decisioning process flow, in accordance with one or more embodiments of the invention.

As illustrated by block 210 of FIG. 3, once the font information is captured, the system (e.g., the one or more personal information systems 30 and/or the one or more organization systems 10, or applications thereof) may access one or more rules engines, such as one or more PII rules engine (e.g., rules engine application and/or system associated therewith). The one or more PII rules engine may determine for specific types of font information (e.g., embedded metadata, the image vectors of the font, the pixel matrix, the stroke paths, or the like) the one or more PII indicators associated with the specific font information. As such, as illustrated by block 212 of FIG. 2, the one or more PII indicators determined from the font information may provide the one or more PII types in the text within the one or more documents. As such, as previously discussed herein, the one or more PII indicators may relate to verifying the presence of PII in the document, the type of PII, locations (e.g., countries, regions, or the like) in which the text is considered PII, or the like.

As illustrated by block 214 of FIG. 2, a decisioning action is taken based on the identification of the existence or lack of existence of PII in the one or more documents. If no PII text is identified in the document (e.g., based on the font information, or the like), the one or more personal information systems 30 and/or the one or more organization systems 10 may allow the occurrence of the document action. However, should one or more PII indicators be identified in the one or more documents indicating the presence of PII text, the PII type, or the like a decisioning action may occur. The one or more PII indicators themselves may provide decisioning information related on how to handle the PII text in the one or more documents. As such, the system may determine the decisioning action based on the one or more PII indicators. Alternatively and/or additionally, the system may access one or more rules engines (e.g., a decisioning rules engine—decisioning application, or the like), which may be the same as or different than the PII rules engine (e.g., may be included in the PII rules engine or may be a separate decisioning engine). The decisioning rules engine, may include rules for taking decisioning actions with respect to documents, or the PII text therein, when the documents are identified as including PII text. The decisioning rules engine may include rules for determining a decisioning action with respect to a document based on the identification of PII text in the document, the type of PII text, the location from which the PII was received, where the PII is stored, where the PII going to be sent, and/or the like, the user taking the document action with respect to the document, any counter parties associated with the action (e.g., counter users or entities that may have access to the document, or the like). It should be understood that the decisioning action may include allowing the document action, preventing the document action, allowing and/or preventing the document action in part, such as redacting the PII text by blocking out the PII text, replacing the PII text, encrypting a portion of the PII text, or taking another like action. The one or more decisioning actions and associated process will be described in further detail with respect to FIG. 3.

It should be understood that in some embodiments the font information within a document may be mapped, such that all of the PII text within the documents, and the location of the PII information within the document is known. The mapping of the PII text within the document may allow for the substitution of the blank spaces, random characters, making the PII text transparent, or other like action, when users do not have access to view the PII text. For example, should the monitoring of the use of the documents, as described in block 206, identify that the user is not authorized to access the PII text in the document, or that the user is a misappropriator, the system may replace and/or block the PII text within the document. As such, as illustrated by block 208, the system may capture font information, which may include the mapping of the PII text within the document. Moreover, as illustrated by block 210, the system may access a rules engine to determine how to handle the PII text within the document. Thereafter, in response, as illustrated in blocks 212 and 214 the PII text within the document is identified, and the action may include redacting the PII text, as discussed above (e.g., substitution of blank spaces, random characters, made transparent, or other like action).

FIG. 3 illustrates a document decisioning process flow, in accordance with one or more embodiments of the invention. As illustrated by block 302 of FIG. 3, the system (e.g., the one or more personal information systems 30 and/or the one or more organization systems 10, or applications thereof) may receive a request from a user 4 to take a document action with respect to one or more documents. For example, as previously discussed with respect to block 206 of FIG. 2, a user 4 may try to view, send, receive, copy, open, update, upload, download, transfer, edit, or take another document action with respect to one or more documents. In some embodiments of the invention the request for the document action may be made automatically by a system (e.g., sending a report automatically to a user on a weekly basis, or the like).

Block 304 of FIG. 3 illustrates that the system may identify the user (e.g., the user making the request and/or the user receiving the document), such as by authenticating the user before allowing the request, checking previous authentication of the user, or other types of authentication. The user 4 may be identified in any way, such as but not limited to, employee name, ID, IP address, computer name, computer identifier, e-mail address, login name, user name, or any other way in which users 4 may be identified. In some embodiments, the user 4 may be required to provide an authentication action, such as password, bio-metric (e.g., finger print, face identification, or the like), GPS of mobile device, keyfob, and/or other authentication actions that provides one, two, or $n^{th}$ level of authentication of the user.

Moreover, block 306 of FIG. 3 illustrates that the system may identify the PII in the one or more documents (e.g., identify PII text, PII type, or the like) for which the user 4 is trying to take a document action. In some embodiments the PII is identified as was described with respect to FIG. 2. For example, as previously discussed herein, the system (e.g., the one or more personal information systems 30 and/or the one or more organization systems, and/or applications thereof) may analyze the text within the document to identify one or more PII indicators defined by the font of the text (e.g., metadata in the font, type of font information of the font, such as the formulas used to define the font, or the like).

Block 308 of FIG. 3 illustrates that a determination is made of the rights that the one or more users 4 have with respect to the document action (e.g., the rights the user 4 undertaking the document action have and/or the rights of a user that is on the receiving end of the document action). For example, one or more engines (e.g., a decisioning engine that is a part of the PII rules engine or separate from the PII rules engine) may be utilized to determine the rights that one or more users 4 have with respect to a document action with documents that include PII, specific PII types within the documents, and/or specific PII. The decisioning engine may include rules regarding what document actions, what PII types, what PII, and/or the like each user can take and/or have access to. As such, based on the one or more users 4 associated with the document action and the PII in the one or more documents associated with the document action, the rights that the one or more users 4 have for the document action may be determined. For example, a determination is made when the document action would be allowed, allowed with restrictions, and/or should be prevented. For example, a first user accessing a document may not be allowed to access the document because it contains a specific type of PII that the first user is not allowed to take any action on (e.g., can't view, send, edit, or the like); a second user may be allowed to view the document but cannot distribute the document based on the specific type of PII; a third user may be able to view and print the document but the PII must be at least partially redacted before the documents is printed (e.g., the PII text must be blacked out, encrypted, generalized, or the like); while a fourth user may be able to access, print, distribute, and/or take any action with the document having the PII. As such, the system may determine if the document action can be allowed, allowed with restrictions, and/or prevented. It should be understood that the decisioning engine may be separate from the PII rules engine or may be the same as the PII rules engine.

FIG. 3 further illustrates in block 310 that depending on the decisioning engine, the system may allow the document action with respect to the one or more documents and/or one or more users 4 associated with the document action. For example, based on the decisioning engine, the document may be viewed, distributed, printed, sent, received, or the like, with or without redacting (e.g., blacking out, altering, encrypting, replacing, or the like all or a portion of the PII text). Alternatively, as illustrated by block 312 of FIG. 3, the system may prevent the document action should the decisioning engine indicate that the one or more users 4 involved in the document action not have the right to be involved in the document action based on the PII within the one or more documents and/or the user access rights.

As illustrated by block 314 in FIG. 3, should the document action be allowed with restrictions, the system may be utilized to automatically edit the information within the one or more documents before the document action is allowed to proceed. For example, should the one or more user 4 have rights to take the requested action, but only if the at least a portion of the PII text is redacted, then the system may automatically alter the PII text within the one or more documents before the document action is allowed. As such, in some embodiments, the system may delete, change, block, alter, or take another redacting step with respect to at least a portion of the PII text (e.g., user name, portion of an account number, portion of an e-mail address, portion of a user identifier—SSN, tax ID, or the like).

In some embodiments of the invention, it should be understood that a document (e.g., a standard document, a mapped document as previously described herein, or the like) may be split apart into sub-documents (e.g., shattered, broken down, cut-up, or the like into pieces of the original document). For example, the different portions of the document that include PII text may be split and stored for future use based on access rules (e.g., different PII may be split into different documents and stored apart, different portions of single PII text may be split and stored apart from each other, or the like). Since the document is split into sub-documents that contain PII, portions of the PII, and/or portions that are non-PII, users that do not have access rights, and/or misappropriators, cannot access the PII information and the various sub-documents that store the different PII text and/or portions thereof. This splitting and storage of the sub-documents with the different types of PII and/or portions thereof, improves the security of the PII because it is more difficult for users and/or misappropriators to access all of the sub-documents needed to identity the combinations of PII within the document (e.g., some PII text may irrelevant without combining two or more portions of split PII text). The rules for splitting the document may be based on the confidentiality of the PII information (e.g., high level, medium level, low level, or the like of confidentiality of the PII), user access rights to the PII (e.g., what user's are allowed to see what PII text), and/or based on location regulations (e.g., region, country, or the like regulation of PII). For example, some PII may be more confidential than other PII and/or may be subject to different regulations (e.g., SSN may be more confidential than user names). Moreover, only certain users may have the right to view some PII (e.g., some users can view an entire SSN, while other users may only view the last four digits, or the like). Finally, some information may be PII in one location, but not in other locations (e.g., an IP address may be PII in one country, but not in another country), and moreover, PII might be handled one way in one location and another way in another location (e.g., the information may be PII in multiple locations, but handled differently). As such, it should be understood that a document may be split and/or reconstructed based on these rules.

Consequently, when a user makes a request to access a document that includes PII, as illustrated in block 302, the user's access rights are checked based on the PII within the document and/or sub-documents (e.g., confidentiality level of the PII, or the like), as illustrated by blocks 304, 306, and 308. Moreover, other rules, such as rules related to the location in which the user will receive the document and/or the location from which the document is being sent, may also be used in order to reconstruct the document. Thereafter, the document is reconstructed based on the rules (e.g., user's access rights, location of the document, and/or the PII text or PII type and confidentiality level thereof within the document, and thus, the sub-documents). As such, reconstruction of the document is based on the user's access rights, and thus, the document will only show the PII that the user is allowed to view. For example, should a document be sent to someone with lower access rights, reconstruction of the document may contain no, or a limited amount of, PII text (e.g., some or all PII text is not reconstructed into the document). Alternatively, should the same document be sent to someone with more or all of the right to access the PII text, the reconstruction of the document may contain most or all of the PII text. When PII is omitted from a reconstructed document (e.g., based on the rights of the user that is viewing, receiving, or the like, the document) the locations of the PII text that were omitted from the reconstructed document may be omitted in a way in which the user is not aware that the document is missing PII text (e.g., document may be amended—such as shifting cells in a spreadsheet). Alternatively, when PII is omitted, the locations of the PII text that were omitted from the reconstructed document may be visually flagged. For example, the location in the document where the PII is omitted may be highlighted, or the like to illustrate that the PII information was not included in the reconstructed document. Additionally, in some embodiments, the visual representation of the omitted PII text may occur in a way that does not indicate the type, length, or other information about the omitted PII text.

It should be understood, as discussed generally herein, that the present invention includes a technical improvement because utilizing the font to define the PII within documents does not increase, or significantly increase the memory requirements, processing speeds, and/or processing efficiency of the systems discussed herein. It should be understood that the systems and documents already store the font information (e.g., vector images of the curves, pixel matrices, stroke paths, or the like) in order to be able to display (e.g., define, render, reproduce, print, or the like) the font within the documents. As such, by using the font not only to allow for the display of the text, but also to define PII in the document, it does not increase, or significantly increase, the requirements of the systems because the font information is already needed to display the font. Moreover, as discussed above mapping the PII text in a document, splitting and storing the document into sub-documents, also reduces storage requirements because the same PII text across multiple document only has to be stored once. As such, the present invention may lessen the requirements of defining and monitoring PII within documents because the present disclosure indicates that such information may be embedded within the font information that already exists, instead of having to create specialized documents and/or attaching additional information within the documents to identify the PII, and moreover, the PII text for multiple documents only has to be stored once.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/208,374 | DOCUMENT VISUALIZATION AND DISTRIBUTION LAYERING SYSTEM | Concurrently herewith |

What is claimed is:

1. A document content identification system, the system comprising:
   one or more memory components having computer readable code stored thereon; and
   one or more processing components operatively coupled to the one or more memory components, wherein the one or more processing components are configured to execute the computer readable code to:

form one or more documents, wherein the one or more documents have personally identifiable information (PII), wherein the one or more documents are populated with one or more PII indicators within font information of font of text, and wherein the one or more PII indicators are automatically implemented as a user enters the text into the one or more documents;

monitor use of the one or more documents from a plurality of documents for the PII;

capture the font information of the font of the text within the one or more documents, wherein the font information comprises formulas used to define how the font is displayed;

identify one or more PII indicators from the font information captured from the font of the one or more documents, wherein the one or more PII indicators are identified when one or more PII formulas from the formulas is identified indicating the font displayed with the one or more PII formulas contains the PII; and implement a decisioning action for the use of the one or more documents based on the one or more PII indicators from the font information captured.

2. The system of claim 1, wherein the one or more PII indicators are selected by the user after the text is entered into the one or more documents.

3. The system of claim 1, wherein the one or more PII indicators are automatically implemented based on a location within the one or more documents in which the text is entered.

4. The system of claim 1, wherein monitoring the use of the one or more documents comprises identifying a user request to access, view, distribute, save, transfer, update, send, receive, copy, open, upload, download, edit, print or take another document action with respect to the one or more documents; and wherein the decisioning action comprises preventing the user request, or redacting at least a portion of the text that is PII text within the one or more documents before allowing the user request.

5. The system of claim 1, wherein differences between a PII font type displayed by the one or more PII formulas for the PII and non-PII font type displayed by the formulas for the font that does not constitute the PII are not visible to the human eye.

6. The system of claim 1, wherein the one or more processing components are configured to execute the computer readable code to:

access one or more PII rules engine;

determine one or more PII rules based on the one or more PII indicators within the one or more documents; and wherein implementing the decisioning action for the use of the one or more documents is based at least in part on the one or more PII rules.

7. The system of claim 1, wherein the one or more PII indicators identify a PII type from a plurality of PII types.

8. The system of claim 1, wherein the font information comprises the formulas for one or more vector images that define the font for the one or more documents, and wherein the one or more PII indicators are defined by the one or more vector images used to define the font.

9. The system of claim 1, wherein the font information comprises the formulas for one or more matrices of pixels representing one or more glyphs for the font, and wherein the one or more PII indicators are defined by the one or more matrices of pixels used to define the font.

10. The system of claim 1, wherein the font information comprises the formulas for one or more stroke paths that define the font for the one or more documents, and wherein the one or more PII indicators are defined by the one or more stroke paths used to define the font.

11. A computer implemented method for a document content identification system, the method comprising:

forming, by one or more processing components, one or more documents, wherein the one or more documents have personally identifiable information (PII), wherein the one or more documents are populated with one or more PII indicators within font information of font of text, and wherein the one or more PII indicators are automatically implemented as a user enters the text into the one or more documents;

monitoring, by the one or more processing components, use of the one or more documents from a plurality of documents for the PII;

capturing, by the one or more processing components, the font information of the font of the text within the one or more documents, wherein the font information comprises formulas used to define how the font is displayed;

identifying, by the one or more processing components, one or more PII indicators from the font information captured from the font of the one or more documents, wherein the one or more PII indicators are identified when one or more PII formulas from the formulas is identified indicating the font displayed with the one or more PII formulas contains the PII; and implementing, by the one or more processing components, a decisioning action for the use of the one or more documents based on the one or more PII indicators from the font information captured.

12. The method of claim 11, wherein the one or more PII indicators are selected by the user after the text is entered into the one or more documents; or are automatically implemented based on a location within the one or more documents in which the text is entered.

13. The method of claim 11, wherein monitoring the use of the one or more documents comprises identifying a user request to access, view, distribute, save, transfer, update, send, receive, copy, open, upload, download, edit, print or take another document action with respect to the one or more documents; and wherein the decisioning action comprises preventing the user request, or redacting at least a portion of the text that is PII text within the one or more documents before allowing the user request.

14. The method of claim 11, wherein differences between a PII font type displayed by the one or more PII formulas for the PII and non-PII font type displayed by the formulas for the font that does not constitute the PII are not visible to the human eye.

15. The method of claim 11, further comprising:

accessing, by the one or more processing components, one or more PII rules engine; and determining, by the one or more processing components, one or more PII rules based on the one or more PII indicators within the one or more documents;

wherein implementing the decisioning action for the use of the one or more documents is based at least in part on the one or more PII rules.

16. The method of claim 11, wherein the font information comprises one or more vector images that define the font for the one or more documents, and wherein the one or more PII indicators are defined by the one or more vector images used to define the font; one or more matrices of pixels representing one or more glyphs for the font, and wherein the one or more PII indicators are defined by the one or more matrices of pixels used to define the font; or one or more stroke paths that define the font for the one or more documents, and wherein the one or more PII indicators are defined by the one or more stroke paths used to define the font.

17. A computer program product for a document content identification system, the computer program product comprising at least one non-transitory computer-readable medium having computer-readable program code portions embodied therein, the computer-readable program code portions comprising:

an executable portion configured to form one or more documents, wherein the one or more documents have personally identifiable information (PII), wherein the one or more documents are populated with one or more PII indicators within font information of font of text, and wherein the one or more PII indicators are automatically implemented as a user enters the text into the one or more documents;

an executable portion configured to monitor use of the one or more documents from a plurality of documents for the PII;

an executable portion configured to capture the font information of the font within the one or more documents, wherein the font information comprises formulas used to define how the font is displayed;

an executable portion configured to identify one or more PII indicators from the font information captured from the font of the one or more documents, wherein the one or more PII indicators are identified when one or more PII formulas from the formulas is identified indicating the font displayed with the one or more PII formulas contains the PII; and an executable portion configured to implement a decisioning action for the use of the one or more documents based on the one or more PII indicators from the font information captured.

18. The computer program product of claim 17, wherein the one or more PII indicators are—selected by the user after the text is entered into the one or more documents; or are automatically implemented based on a location within the one or more documents in which the text is entered.

19. The computer program product of claim 17, wherein the executable portion configured to monitor the use of the one or more documents comprises identifying a user request to access, view, distribute, save, transfer, update, send, receive, copy, open, upload, download, edit, print or take another document action with respect to the one or more documents; and wherein the decisioning action comprises preventing the user request, or redacting at least a portion of the text that is PII text within the one or more documents before allowing the user request.

20. The computer program product of claim 17, wherein differences between a PII font type displayed by the one or more PII formulas for the PII and non-PII font type displayed by the formulas for the font that does not constitute the PII are not visible to the human eye.

* * * * *